US008712708B2

(12) United States Patent
Halme

(10) Patent No.: US 8,712,708 B2
(45) Date of Patent: Apr. 29, 2014

(54) METHOD OF ESTIMATING REMAINING CONSTANT CURRENT/CONSTANT VOLTAGE CHARGING TIME

(76) Inventor: Matti Samuli Halme, Espoo (FI)

( * ) Notice: Subject to any disclaimer, the term of this patent is extended or adjusted under 35 U.S.C. 154(b) by 838 days.

(21) Appl. No.: 12/911,075

(22) Filed: Oct. 25, 2010

(65) Prior Publication Data
US 2012/0101754 A1   Apr. 26, 2012

(51) Int. Cl.
*G01R 31/36* (2006.01)
(52) U.S. Cl.
USPC .......................................................... 702/63
(58) Field of Classification Search
USPC .......................................................... 702/63
See application file for complete search history.

(56) References Cited

U.S. PATENT DOCUMENTS

| 6,888,354 | B1 | 5/2005 | Gofman |
| 7,528,576 | B2 | 5/2009 | Ukon |
| 2007/0123316 | A1 | 5/2007 | Little |
| 2009/0273318 | A1 | 11/2009 | Rondoni et al. |

FOREIGN PATENT DOCUMENTS

| JP | 407274408 A | * | 10/1995 |
| JP | 10178747 | | 6/1998 |
| JP | 2006262605 | | 9/2009 |

OTHER PUBLICATIONS

2_BlackBerry App World; Battery Status; http://appworld.blackberry.com/webstore/content/5360.
Better display of Battery Charge Level; http://maemo.org/community/brainstorm/view/better_display_of_battery_charge_level/ ; Sep. 9, 2010.
Texas Instruments Production Data Information; bq27501; System-Side Impedance Track (TM) Fuel Gauge ; SLUS879A—Oct. 2008—Revised Jun. 2009; Copyright (c) 2008-2009, Texas Instruments Inc.

* cited by examiner

*Primary Examiner* — Stephen Cherry
(74) *Attorney, Agent, or Firm* — Locke Lord LLP

(57) ABSTRACT

Method, apparatus, and computer program product embodiments are disclosed for estimating the remaining charging time of a rechargeable battery. An example embodiment of the invention comprises a method comprising the steps of determining if the battery charging point is in a constant current phase or in a constant voltage phase; if the battery charging point is in the constant current phase, calculating a time remaining to charge in the constant current phase based on the constant current phase charging characteristics and a time remaining to charge in the constant voltage phase based on the constant voltage phase charging characteristics; and if the battery charging point is in the constant voltage phase, calculating a time remaining to charge in the constant voltage phase based on the constant voltage phase charging characteristics.

16 Claims, 9 Drawing Sheets

METHOD OF ESTIMATING REMAINING CONSTANT CURRENT/CONSTANT VOLTAGE CHARGING TIME

FIELD

The field of the invention relates to estimating the remaining charging time of a rechargeable battery.

BACKGROUND

Batteries are essential for the portability of wireless terminals, for example cellular phones and other portable communication devices. Rechargeable batteries in cellular phones and other portable communication devices, such as NiCd, nickel-metal hydride (NiMH), Lithium-ion, and Lithium-Polymer batteries, may be recharged with household alternating current (AC) power coupled through a voltage reduction transformer, an alternating-to-direct current converter, and appropriate battery monitoring and charging circuits. They may also be recharged with a 12-volt cigarette lighter socket provided in an automobile coupled through a DC voltage reduction circuit and appropriate battery monitoring and charging circuits. However, typical battery chargers do not provide a reliable estimate of the remaining charging time needed until the battery is charged to its maximum capacity.

SUMMARY

Method, apparatus, and computer program product embodiments are disclosed for estimating the remaining charging time of a rechargeable battery. An example embodiment of the invention comprises a method comprising the steps of:

detecting an availability of a charger adapter;

determining whether a battery charging point is in a constant current phase or in a constant voltage phase, based on pre-determined battery charging characteristics, wherein the pre-determined battery charging characteristics comprise constant current phase charging characteristics and constant voltage phase charging characteristics;

if the battery charging point is in the constant current phase, calculating a time remaining to charge in the constant current phase based on the constant current phase charging characteristics; and if the battery charging point is in the constant voltage phase, calculating a time remaining to charge in the constant voltage phase based on the constant voltage phase charging characteristics.

Example embodiments of the invention comprise a computer readable medium, comprising program instructions, which when executed by a computer processor, perform the steps of the above example method embodiments.

Example embodiments of the invention comprise an apparatus, comprising:

at least one processor;

at least one memory including computer program code;

the at least one memory and the computer program code configured to, with the at least one processor, cause the processor at least to:

detect an availability of a charger adapter;

determine whether a battery charging point is in a constant current phase or in a constant voltage phase, based on pre-determined battery charging characteristics, wherein the pre-determined battery charging characteristics comprise constant current phase charging characteristics and constant voltage phase charging characteristics;

if the battery charging point is in the constant current phase, calculate a time remaining to charge in the constant current phase based on the constant current phase charging characteristics; and if the battery charging point is in the constant voltage phase, calculate a time remaining to charge in the constant voltage phase based on the constant voltage phase charging characteristics.

The resulting example embodiments of the invention enable estimating the remaining charging time of a rechargeable battery.

DISCUSSION OF EXAMPLE EMBODIMENTS OF THE INVENTION

Batteries are essential for the portability of wireless terminals, for example cellular phones and other portable communication devices. Rechargeable batteries in cellular phones and other portable communication devices, such as NiCd, nickel-metal hydride (NiMH), lithium iron phosphate (LiFePO$_4$), Lithium-ion, and Lithium-Polymer batteries, may be recharged with household alternating current (AC) power coupled through a voltage reduction transformer, an alternating-to-direct current converter, and appropriate battery monitoring and charging circuits. Alternatively the batteries may be charged from a direct current source for example from a portable device, an external battery pack, a solar panel or another external/internal power source.

Figure 1A:
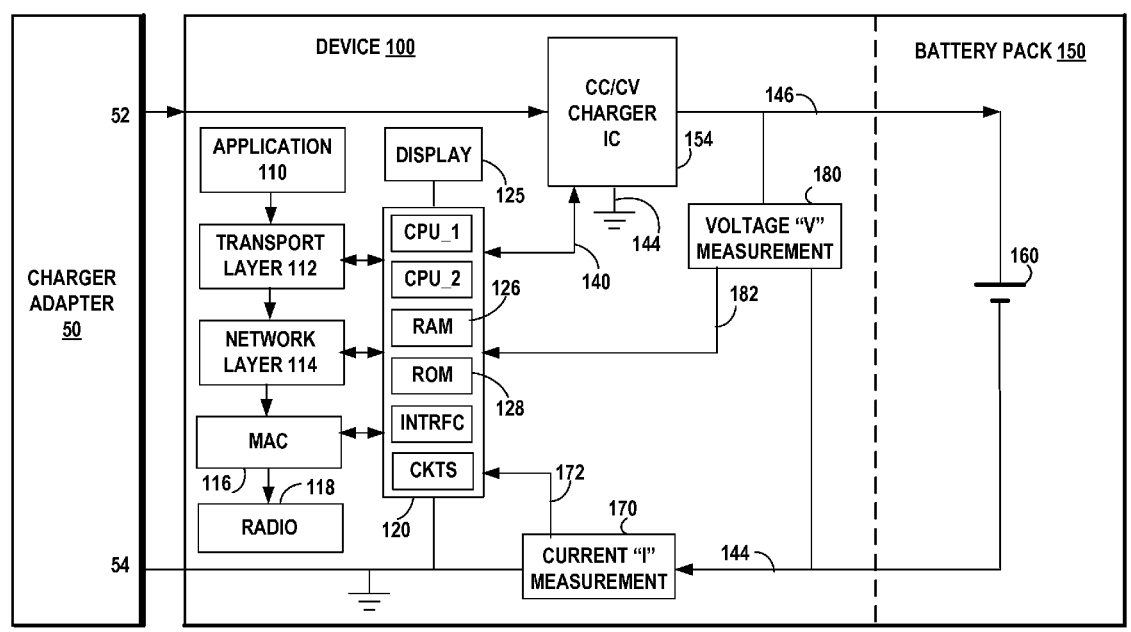
FIG. 1A illustrates an example embodiment for estimating the remaining charging time of a rechargeable battery, in accordance with an embodiment of the invention.

FIG. 1A illustrates an example embodiment for estimating the remaining charging time of a rechargeable battery 160 in a battery pack 150. The example apparatus, such as a wireless device or terminal 100 and the example battery pack 150 are connected to an example charger adapter 50, in accordance with an embodiment of the invention. The wireless device 100 may be a communications device, such as a cell phone, portable radio, portable TV, PDA, laptop computer, palmtop computer, or the like, capable of communicating in a personal area network (PAN), local area network (LAN), or wide area network (WAN).

The example battery pack 150 of FIG. 1A comprises the battery 160. In an alternative embodiment the battery 160 may comprise several batteries or cells. The charger adapter 50 provides a DC voltage up to a maximum current, but does not regulate the voltage and current at programmed levels. The charger adapter 50 has its positive output terminal 52 connected over line 146 to the constant current/constant voltage (CC/CV) charger integrated circuit (IC) 154. The CC/CV charger IC 154 outputs a regulated current and voltage to charge the positive terminal of battery 160. The charging current from the negative terminal of battery 160 passes over line 144 and through the current measurement module 170 to the ground terminal 54 of the charger adapter. The current measurement module 170 provides current measurement values "I" on line 172 to the processor 120 of the device 100. The voltage measurement module 180 is connected across the terminals of the battery 160 and provides voltage measurement values "V" on line 182 to the processor 120 of the device 100. The processing module 120 of the device 100 is programmed to control the CC/CV charger IC 154 over line 140 to apply charging current and voltage to the battery 160 in accordance with a constant current/constant voltage charging process.

The example wireless device or terminal 100 of FIG. 1A comprises a protocol stack, including the radio 118 and the media access control (MAC) 116, which may be based, for example, on various cellular telephone network standards, wireless local area network (LAN) standards, or other wireless communications standards. Other network types may make use of example embodiments of the invention. The protocol stack may also include a network layer 114, a transport layer 112, and application programs 110. The example wireless device 100 includes a processor 120 that may include a dual core central processing unit (CPU) CPU_1 and CPU_2, a random-access memory (RAM) memory 126, a read-only memory (ROM) memory 128, an interface for a keypad, display, and other input/output devices, and circuits (CKTS) to carry out the functions of the example embodiments. The interface circuits may interface with one or more radio transceivers, battery and other power sources, key pad, touch screen, display, microphone, speakers, ear pieces, camera or other imaging devices, etc. The RAM and ROM may be removable memory devices such as smart cards, SIMs, wireless identification modules (WIMs), semiconductor memories such as RAM, ROM, programmable read-only memories (PROMS), flash memory devices, etc. The processor protocol stack layers, and/or application program may be embodied as program logic stored in the RAM and/or ROM in the form of sequences of programmed instructions which, when executed in the CPU, carry out the functions of the disclosed embodiments. The program logic may be delivered to the writeable RAM, PROMS, flash memory devices, etc. of the coexistence enabler and processor from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device 100 may be separate transceiver circuits or alternately, the one or more radios may be a single radio frequency (RF) module capable of handling one or multiple channels in a high speed, time and frequency multiplexed manner in response to the processor.

Figure 1B:
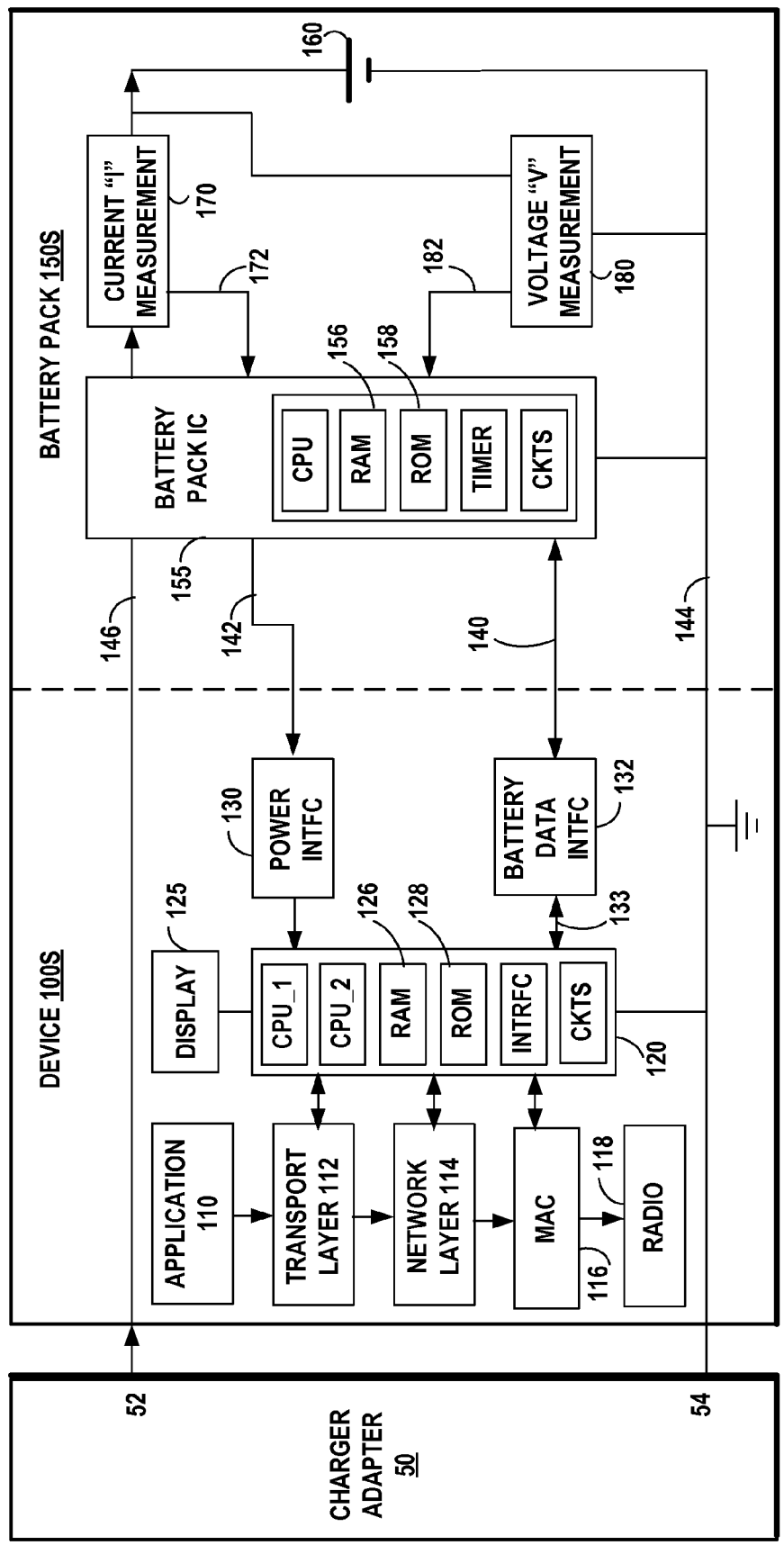
FIG. 1B illustrates an example alternate embodiment for estimating the remaining charging time of a rechargeable battery contained in an example "smart battery" pack, in accordance with an embodiment of the invention.

FIG. 1B illustrates an example alternate embodiment for estimating the remaining charging time of a rechargeable battery 160 contained in an example "smart battery" pack 150S. The example apparatus, such as a wireless device or terminal 100S and the example "smart battery" pack 150S are connected to an example charger adapter 50, in accordance with an embodiment of the invention. The example wireless device 100S is configured to use the example "smart battery" pack 150S.

The example "smart battery" pack 150S of FIG. 1B includes a battery pack integrated circuit (IC) 155 that includes a CPU, RAM memory 156, ROM memory 158, a timer, and circuits (CKTS) to provide a regulated current and voltage over line 142 to the power interface (INTFC) 130 of the device 100. The charger adapter 50 provides a DC voltage up to a maximum current, but does not regulate the voltage and current at programmed levels. The charger adapter 50 has its positive output terminal 52 connected over line 146 to the battery pack IC 155. The battery pack IC outputs a regulated current and voltage to charge the battery 160. The charging current to the battery 160 passes through the current measurement module 170 to the positive terminal of the battery 160. The current measurement module 170 provides current measurement values "I" on line 172 to the battery pack integrated circuit (IC) 155. The ground terminal 54 of the charger adapter 50 is connected over line 144 to the negative terminal of the battery 160. The voltage measurement module 180 is connected across the terminals of the battery 160 and provides voltage measurement values "V" on line 182 to the battery pack integrated circuit (IC) 155. The battery pack IC outputs values for the measured battery current "I" and measured battery voltage "V" over the data line 140 to the battery data interface (INTFC) 132 and the line 133 to the processing module 120 of the device 100. The processing module 120 of the device 100 is programmed to control the battery pack IC 155 to apply charging current and voltage to the battery 160 in accordance with a constant current/constant voltage charging process.

The data exchanged between the device 100 and the "smart battery" pack integrated circuit (IC) 155 of FIG. 1B, passes data between the processor 120 in the device 100 over the line 133 to the battery data interface 132 in the device 100, and through the communication line 140 that may be part of a battery connector to the to the "smart battery" pack integrated circuit (IC) 155. The estimated value of the time remaining to charge (TREM) of a rechargeable battery 160 may be provided by the processor 120 in the device 100 and displayed to the user on the display 125, in accordance with example embodiments of the invention.

Figure 2:
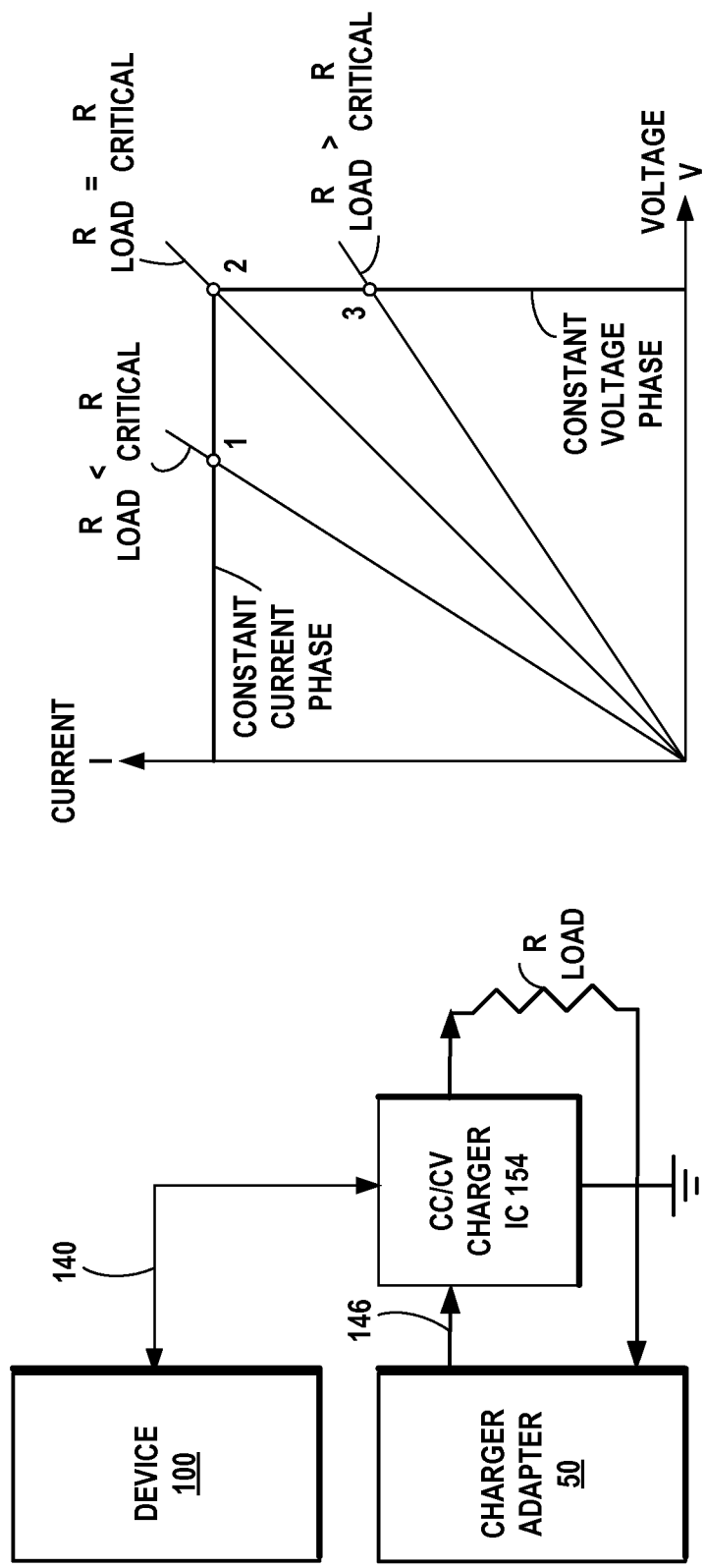
FIG. 2 illustrates the general principles of operation of the constant current/constant voltage (CC/CV) charger IC of FIG. 1A, in accordance with an embodiment of the invention.

In order to illustrate the general principles of operation of the constant current/constant voltage (CC/CV) charger IC 154 of FIG. 1A, an example "ideal" output current-voltage (I-V) characteristic of the CC/CV charger IC 154 is shown in FIG. 2, when supplying current I through a variable resistance load R(load). When R(load) is connected across the terminals of the CC/CV charger IC 154 and a constant current I flows through the load, the voltage across the load is given by Ohm's law: V=IR. As long as the voltage is below a maximum value, the current through the load will be constant. The CC/CV charger IC 154 thus operates in the constant current (CC) phase at an operating point 1. If the resistance of R(load) is increased while the constant current I is flowing through it, the voltage V=IR increases until it reaches a maximum allowable value at the operating point 2. Beyond this point, as the resistance of R(load) is increased, the voltage will be limited and the CC/CV charger IC 154 begins to operate in the constant voltage (CV) phase at an operating point 3. The resistance R(critical) is called the critical resistance at the operating point 2 and determines whether the CC/CV charger IC 154 operates in the constant current CC phase where R(load) <R(critical) or in the constant voltage CV phase where R(load)>R(critical). The relevance of the general principles of operation illustrated in FIG. 2 to charging the rechargeable battery 160 with the CC/CV charger IC 154, is that the load represented by the battery 160 varies in a manner approximately resembling that of a variable resistance R(load), as the battery 160 accumulates charge during a charging operation by the CC/CV charger IC 154. As the accumulated charge in the battery 160 increases, there comes a point at which the operation of the CC/CV charger IC 154 passes from the constant current (CC) phase to the constant voltage (CV) phase. In accordance with an embodiment of the invention, estimating the remaining charging time of the rechargeable battery 160 is based on determining whether the battery's charging point is in the constant current phase or in the constant voltage phase.

In the constant current phase the CC/CV charger IC 154 regulates its output current to be the maximum current that is allowed for the battery 160. The actual charging current "I" may be lower than the output current of the CC/CV charger IC 154, since often the CC/CV charger IC 154 is also used to provide energy for the device 100, itself.

In the constant voltage phase the CC/CV charger IC 154 regulates its output voltage to be the maximum voltage that is allowed for the battery 160. The measured battery voltage (VBAT) may be slightly lower than the output voltage of the CC/CV charger IC 154, because of impedance between the output of the CC/CV charger IC 154 and the VBAT measurement point of the measurement module 180. That may mean that the measured voltage is not really constant, but increases slightly during this phase. The battery is considered fully charged and charging is terminated when the charging current drops below a predefined limit, for example C/20 (the battery nominal capacity divided by 20).

Figure 3:
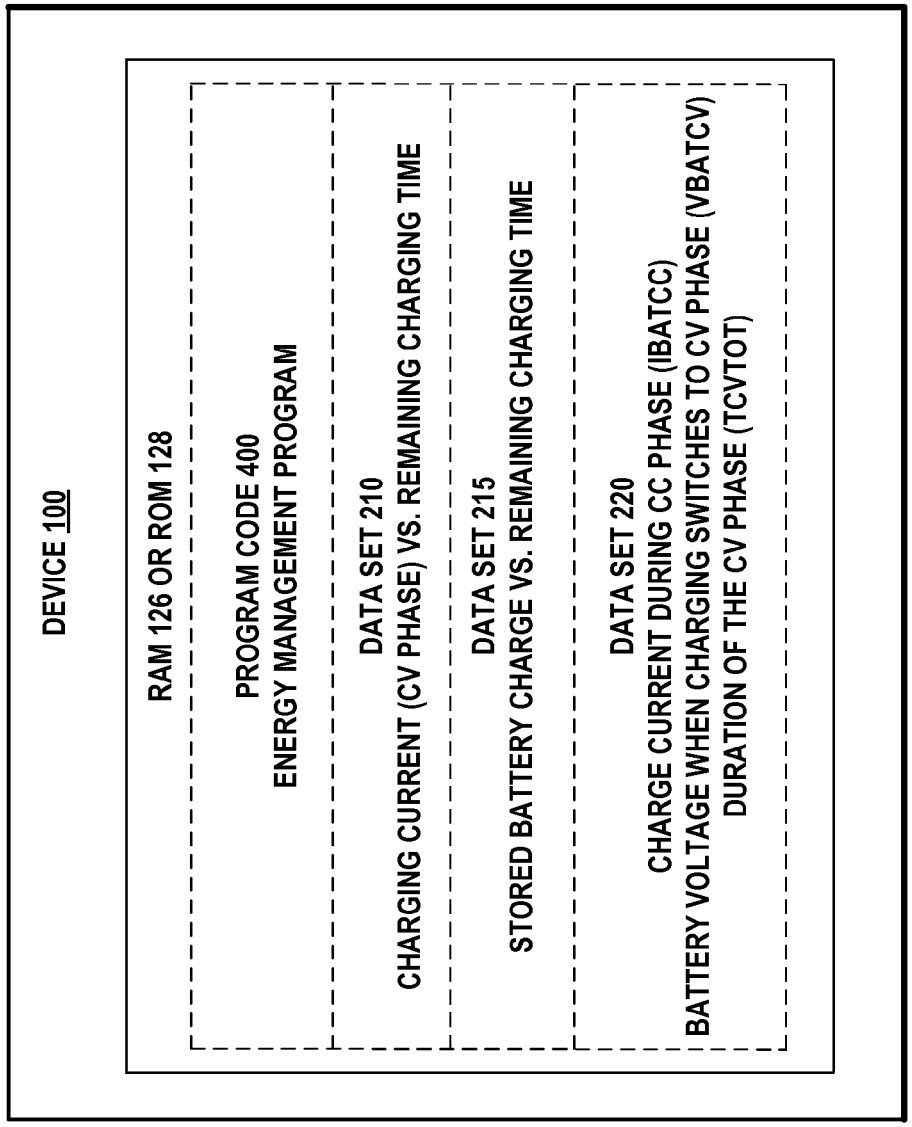
FIG. 3 is an example functional block diagram of the memory in the device or terminal of FIG. 1A, storing programs, pre-measured data sets for the battery, and tracking measurements for the present state of the battery, in accordance with an embodiment of the invention.

FIG. 3 is an example functional block diagram of the RAM 126 and/or ROM 128 memory in the device 100 of FIG. 1A, storing an energy management program 400, a pre-measured data set 210 of data points for values of stored battery charge capacity (CAP(t)) versus time remaining to charge TREM and a pre-measured data set 215 of data points for values of charging current C(t) (CV phase) versus time remaining to charge TREM. The RAM 126 and/or ROM 128 memory in the device 100 may also store a pre-measured data set 220 of a value of the charge current during the constant current phase, a value of the battery voltage when charging switches to the constant voltage phase, and a value of the duration of the constant voltage phase, in accordance with an embodiment of the invention.

In example embodiments of the invention, the RAM 126 and/or ROM 128 memory in the device 100 may also a store data set of records [Ii Vi Qi Ti] for sampling times Ti and data set of present stored battery charge CAP(t). The records [Ii Vi Qi Ti] represent the present value of the measured current Ii at the sampling time T1, and the present value of the increment in the charge Qi flowing into the battery at sequential times Ti. Optionally, the records may include present value of the measured voltage V1 at the time the time T1. The RAM 126 and/or ROM 128 memory in the device 100 may also store maximum stored battery charge (MAXCAP).

Figure 4A:
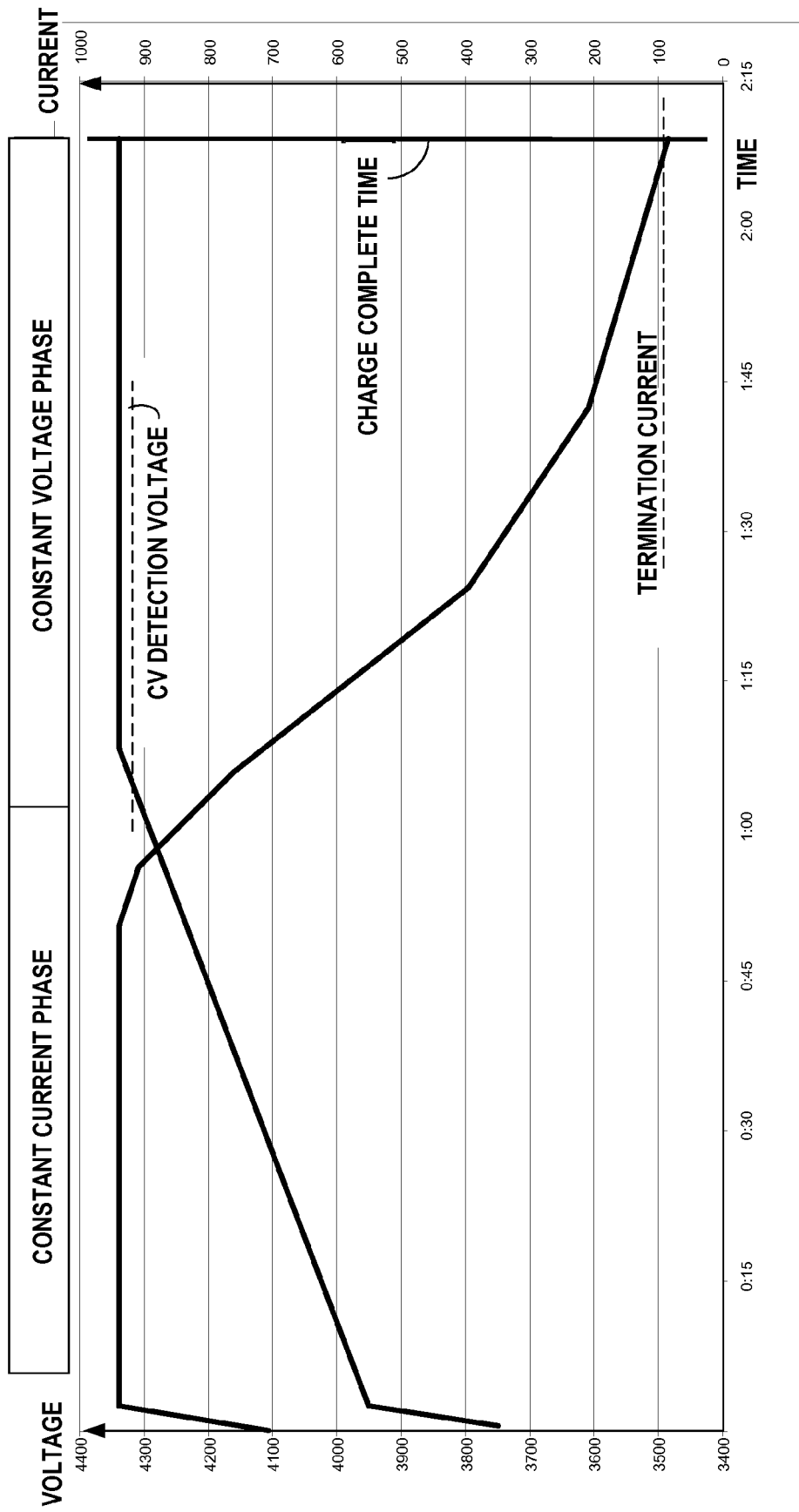
FIG. 4A is an example graph of charging with a constant current/constant voltage process, in accordance with an embodiment of the invention.

FIG. 4A is an example graph of charging with a constant current/constant voltage process, in accordance with an embodiment of the invention. Values for current I measured by the current measurement module 170 to the battery 160 are on the right side ordinate and values for the voltage V measured by the voltage measurement module 180 across the terminals of the battery 160 are on the left side ordinate. The time axis along the abscissa is divided into the constant current phase on the left portion and the constant voltage phase on the right portion. The transition from the constant current phase to the constant voltage phase occurs when the increasing load resistance R(load) of the partially charged battery 160 equals the critical resistance R(critical).

Figure 4B:
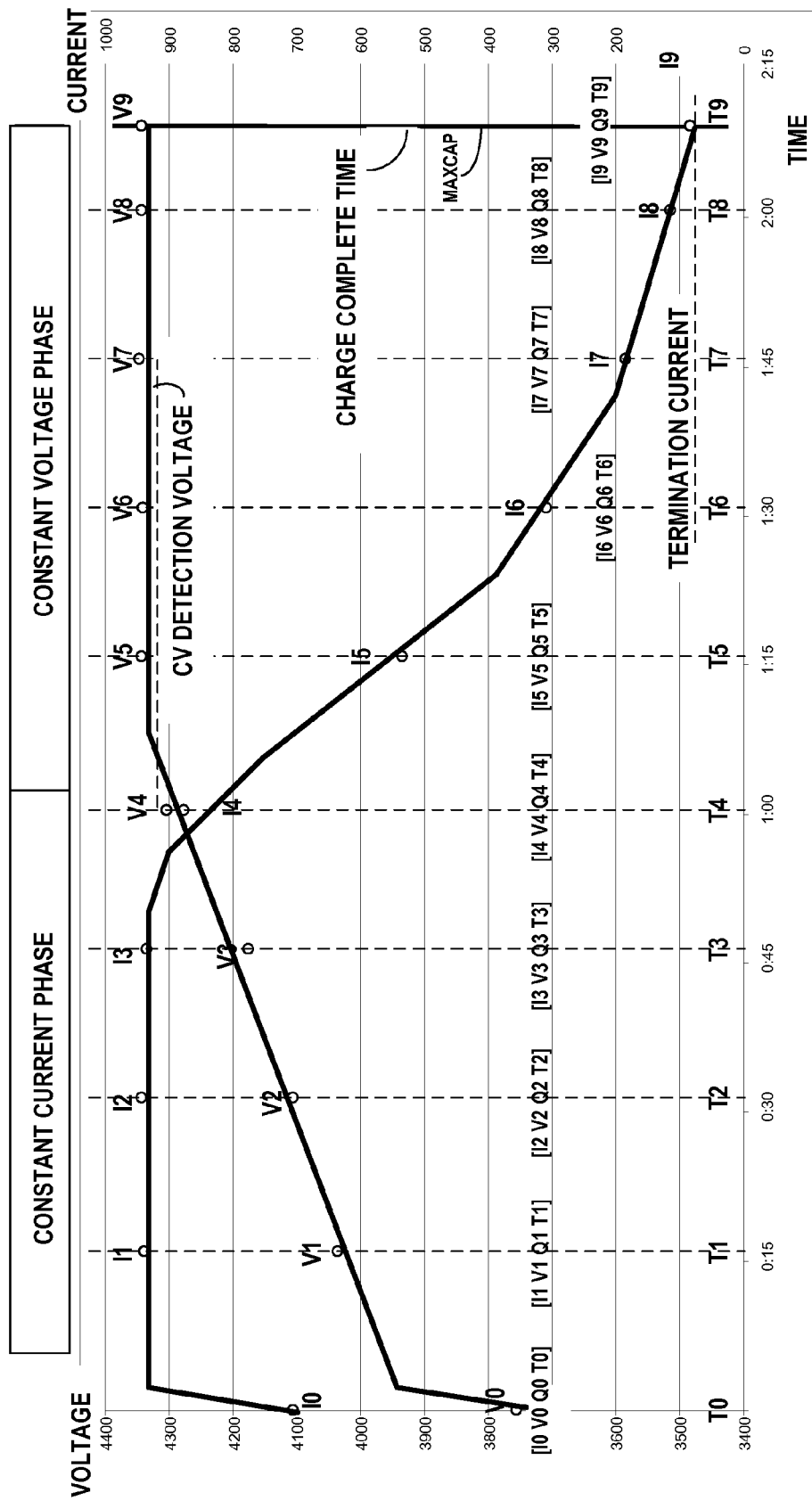
FIG. 4B is an example graph of charging with a constant current/constant voltage process, showing the graph of current vs. voltage as in FIG. 4A, and further depicting the records [Ii Vi Qi Ti] corresponding to each sampling time T1, in accordance with an embodiment of the invention.

The charging of the battery 160 in the battery pack 150 may be performed by the charger adapter 50, as shown in the graph of FIG. 4B. The battery's charge state is typically tracked by the energy management program 400. At the time T0, the charge state of the battery is the residual charge Q0. The device 100 may be placed in a minimally powered operating state with only its display indicating that battery charging is taking place. At the time T1, the increment in the charge Q1 that has flowed into the battery is approximately Q1=I1*(T1−T0). At the time T2, the increment in the charge Q2 that has flowed into the battery is approximately Q2=I2*(T2−T1) and at that instant T2, the present stored battery charge capacity CAP(T2) that has accumulated in the battery is the sum of Q0+Q1+Q2. At any time Tj, the present stored battery charge CAP(j) that has accumulated in the battery is the sum of Q0+Q1+Q2+ . . . +Qj. At the end of the charging operation, shown for example at T9 in FIG. 4B, when the battery 160 has reached its maximum stored battery charge MAXCAP, the charge that has accumulated in the battery is the sum of the incremental charges Q0+Q1+Q2+ . . . +Q9. The values of the charge increments Qi may be computed from the values of the current Ii measured by the current measurement module 170 at each sampling time T1. The measured and computed values may be stored in the records [Ii Vi Qi Ti] in the dataset in the RAM 126 and/or ROM 128 memory in the device 100. The records [Ii Vi Qi Ti] may be available for monitoring and managing the battery in the following example processes.

Example embodiments of the invention are disclosed for estimating the remaining charging time of a rechargeable battery. Example embodiments of the invention may include the stages of: [1] Pre-measurements for each combination of device 100 and battery 160 type; [2] Calculating the initial remaining charging time estimate immediately when charging starts based on a rough classification of the charger adapter type and the present estimate of the stored charge battery 160 capacity; [3] Determining whether the charging is in the constant current or constant voltage phase; [4] Calculating the remaining charging time estimate during the CC phase based on the present estimate of the battery 160 stored battery charge and the actual charge current; and [5] Calculating the remaining charging time estimate during the CV phase based on the actual charge current.

Example embodiments of the invention may distinguish whether the battery 160 is presently being charged in constant current or constant voltage phase and apply different estimation inputs and formulas in each of these phases. In example embodiments of the invention, there may be no need to pre-collect data for more than one of the supported charger adapters 50. In example embodiments of the invention, the estimation in the constant voltage phase is based on the charging current rather than on the battery 160 voltage.

Pre-Measurements for Each Combination of Device and Battery Type

In example embodiments of the invention, the method may utilize data providing mapping of remaining charging time to stored battery 160 charge or charging current (during CV phase).

Figure 4C:
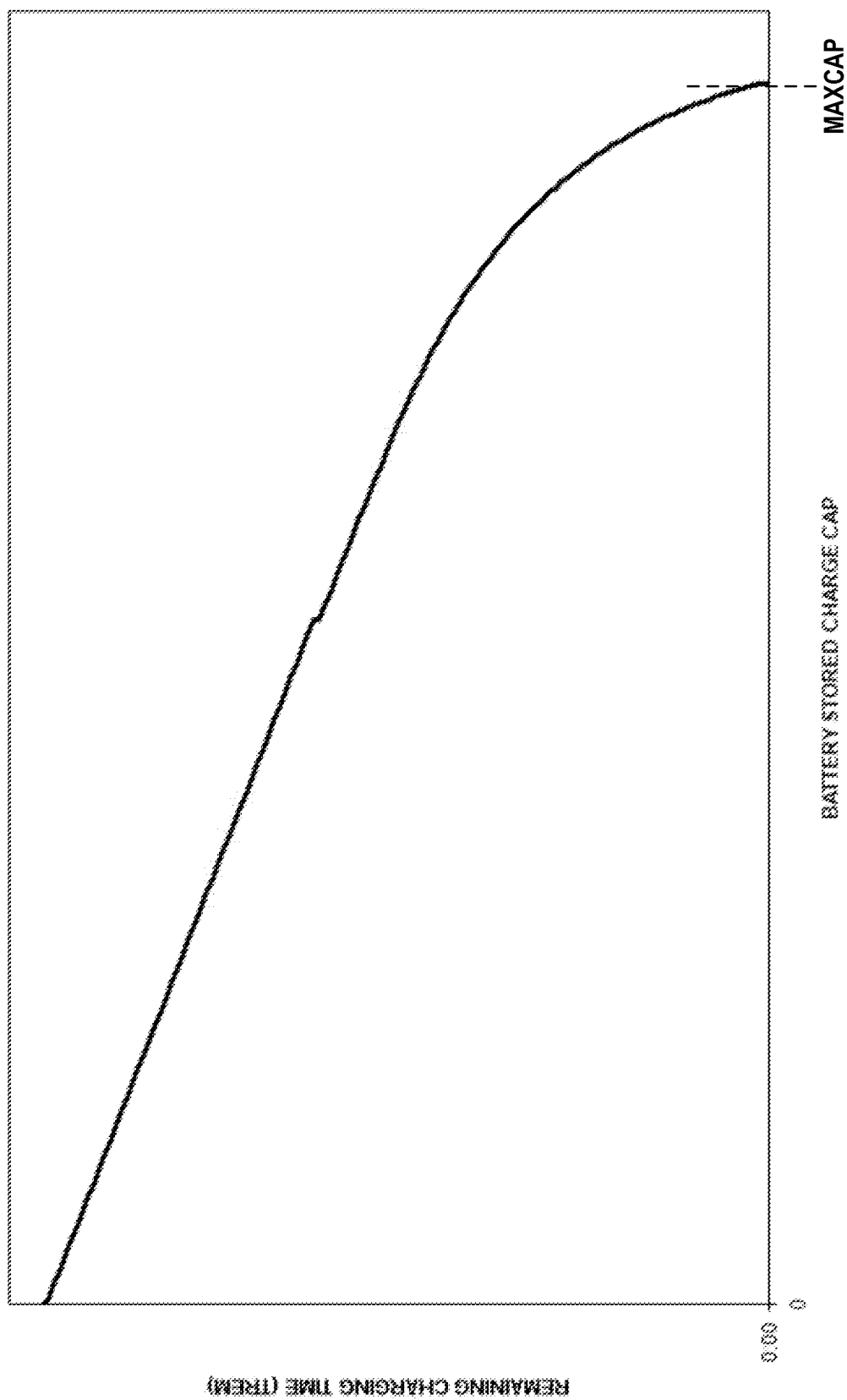
FIG. 4C is an example graph of pre-measured data set of data points for values of the battery stored charge CAP(t) versus remaining charging time TREM.
Figure 4D:
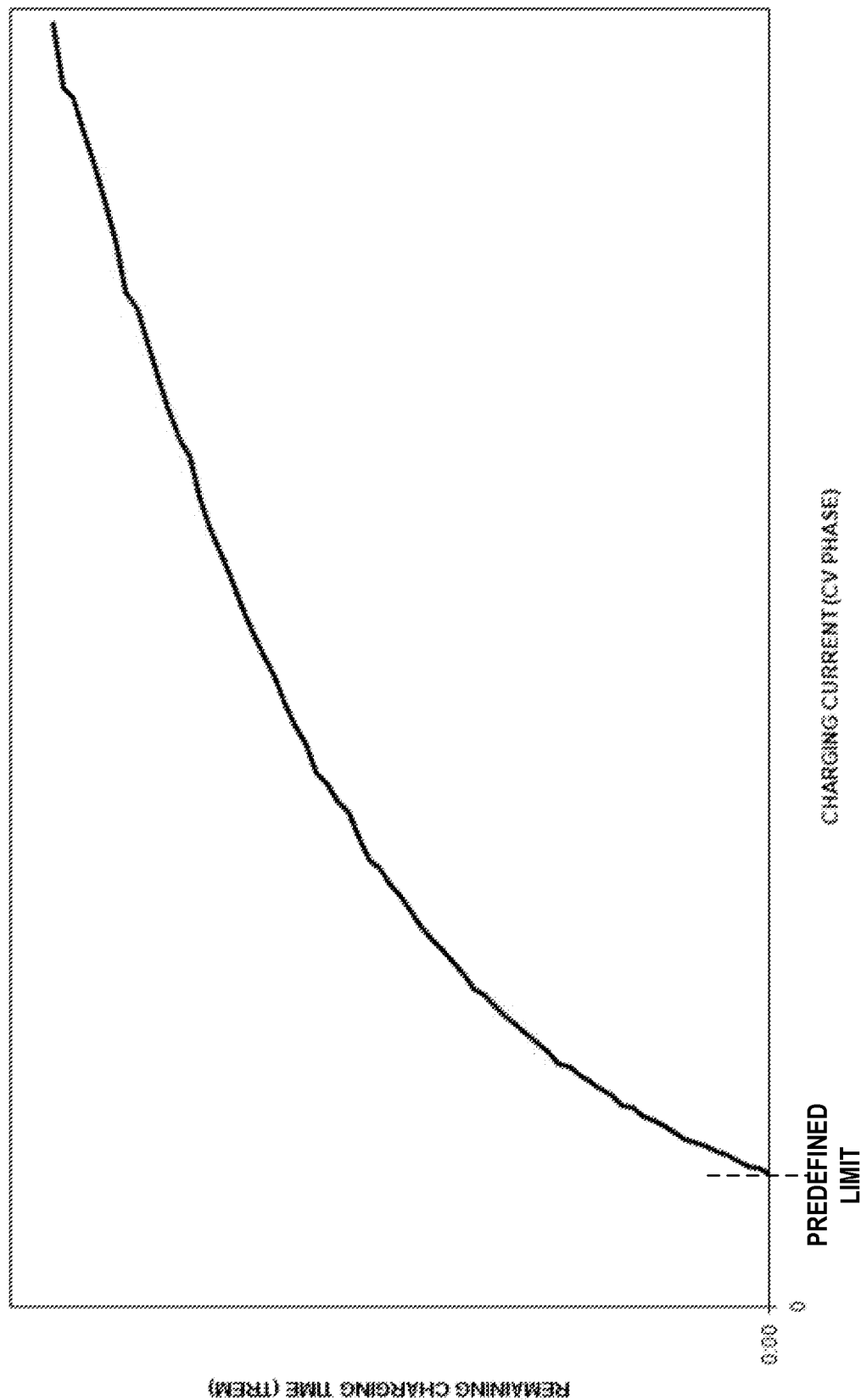
FIG. 4D is an example graph of pre-measured data set of data points for values of charging current C(t) (CV phase) versus remaining charging time TREM.

This data may be stored in the device 100 as a pre-measured data set 215 of data points for values of stored battery charge CAP(t) versus remaining charging time TREM shown in FIG. 4C and a pre-measured data set 210 of data points for values of charging current C(t) (CV phase) versus remaining charging time TREM shown in FIG. 4D. This data is unique for each device 100 model and battery 160 model. However, the same data in datasets 210 and 215 may be used with any charger adapter or other DC current source that is used with device 100 and battery 160. The data may be pre-stored in the device or may be downloaded or updated from a server in case a new battery model is available. The capacity of a battery is the quantity of electrical charge stored in the battery at a given level. The capacity of a fully charged battery is usually measured in amp-hours (AH) or milliamp-hours (mAH), and is a measure of the size of the battery. As the charging current delivers electrical charge to the battery, the energy of the battery increases and is determined by the product of the charge stored and the battery voltage.

FIG. 4C is an example graph of pre-measured data set 215 of data points for values of the battery stored charge CAP(t) versus remaining charging time TREM.

FIG. 4D is an example graph of pre-measured data set 210 of data points for values of charging current C(t) (CV phase) versus remaining charging time TREM.

In example embodiments of the invention, the data in datasets 210 and 215 may be measured for a particular device 100 model and its battery 160 using, for example, the kind of charger adapter that is intended to be shipped with that device 100. For making the measurements, there is no special hardware needed. During the measurement, the load of the device 100 may be constant and represent the idle consumption, for example only the display 125 is running and merely indicates that charging in underway. It is also possible that the display is off during charging and also during the pre-measurements. The measured data for datasets 210 and 215 may then be converted to a static data structure as a record or C-Language struct, to be operated on by the energy management software 400. It may be sufficient to store, for example, 50 data points, so the size of the data sets 210 and 215 may be small, for example on the order of 300 bytes.

Along with the measured data for datasets 210 and 215, the following information may be stored in the device 100 as dataset 220 for each combination of device 100 battery 160 type: [1] Charge current during CC phase (IBATCC); [2] Battery 160 voltage when the charging switches to the CV phase (VBATCV). If the battery 160 voltage slightly increases during the CV phase, a value of the lowest voltage in the constant voltage phase may be chosen; and [3] Duration of the CV phase (TCVTOT).

In example embodiments of the invention, the present stored battery charge CAP(t) data set and the maximum stored battery charge MAXCAP may be stored in the RAM 126 and/or ROM 128 memory in the device 100. Optionally, the records [Ii Vi Qi Ti] collected during the charging of the battery 160 in the battery pack 150, may be stored in the dataset in the RAM 126 and/or ROM 128 memory in the device 100. These several data sets may be stored in the RAM 126 and/or ROM 128 memory in the device 100, as shown in FIG. 3. Collecting and storing the value Vi in the record is optional.

Calculating the Initial Remaining Charging Time Estimate

For enhanced user experience, the remaining charging time estimate may be shown to the user on display 125 right after the charger cable 52/54 has been connected. However, the following factors may make it more difficult to initially calculate the estimate: [1] The power consumption may momentarily be higher than the average during charging, for example, because the display 125 may be automatically turned on when the charger cable 52/54 is connected; and [2] The processor 120 may be programmed for step charging, wherein charging may be started with a lower current and then be gradually raised to the maximum charging current (step charging).

For these reasons, the charge current measurements taken right after the charger cable 52/54 has been connected may not reflect the likely average charge current during the charging operation. The solution may be to use a predefined initial charge current value in the calculation and then proceed with the estimation.

This predefined initial charge current is specific for each device 100 type and separate for each category of charger adapter 50s. These categories depend on what kind of Universal Serial Bus (USB) charging or other charging interface the device 100 supports. They may be for example: [1] A dedicated charger adapter 50 (using either a USB interface or a dynamo interface); [2] A USB standard downstream port with enumeration (500 mA mode, USB500); or [3] A USB standard downstream port without enumeration (100 mA mode, USB100). In enumeration, the USB device's information is read by the USB host and the device is assigned a unique 7-bit address.

The correct category of the charger adapter 50 may be identified soon after the charging cable 52/54 has been connected. Detection of the type of charger adapter 50 may be used to configure charging. Categories of charger adapter 50 include an AC adaptor or wall charger, a USB500 charger (providing maximum 500 mA) or a USB 100 charger (providing maximum 100 mA). This may help improve the accuracy right after the charger has been connected.

Determining Whether the Charging is in the CC or CV Phase.

CCCV charging consists of the Constant current phase and the Constant voltage phase. The remaining charging time estimation is done differently in the CC and the CV phases, thus requiring a determination of the present charging phase.

Initially, charging is considered to be in the CC phase. The charging is considered to move from the CC phase to the CV phase when both of the following are true:

$$VBAT >= VBATCV - VBATCVOFFSET \qquad 1.$$

$$VBATTREND <= VBATTRENDLIMIT \qquad 2.$$

Where:

VBAT is the measured battery 160 voltage. It may be filtered using for example an average filter over 60 seconds and a 5 second sampling interval.

VBATCV is the pre-measured CV voltage.

VBATCVOFFSET is a pre-defined constant, such as 50 mV. The purpose of this constant is to make sure that the CV phase is detected in all devices 100 despite the charge voltage regulation and VBAT measurement inaccuracy.

VBATTREND is the difference of VBAT now and an earlier VBAT, taken for example 60 seconds ago.

VBATTRENDLIMIT is a predefined constant, such as 10 mV

It may also happen that charging switches from the CV phase back to the CC phase. This may happen for example when device 100 energy consumption significantly increases and the maximum output current of the charger adapter 50 is not sufficient to allow the CC/CV charger IC 154 to maintain the regulated charging voltage. This situation may be detected by a lower VBAT. The charging is considered to move from CV phase back to the CC phase when the following is true:

$$VBAT < VBATCV - VBATCVOFFSET - VBATCVHYS \quad 3.$$

Where:
VBATCVHYS is a predefined hysteresis prevention limit, such as 20 mV
CCCV charging with the CV detection voltage (VBATCV−VBATCVOFFSET) is illustrated in FIG. 4A.

Calculating the Remaining Charging Time Estimate During the CC Phase

The remaining charging time estimate during the CC phase is calculated in the following way:

1. TCAP=T(CAP), where T represents the pre-measured data that provides the remaining charging time estimate based on the battery 160 stored battery charge estimate CAP. The pre-measured data set 215 of data points provides values of the battery stored charge CAP(t) versus remaining charging time. Since the pre-measured data is stored as a set of datapoints in data set 215, interpolation is used to find the time more accurately. T may also present a mathematical model that fits to the pre-measured data. The present stored battery charge CAP may also be available as a stored value in the data set. For example, the current measurement module 170 may be continuously monitored by the processor 120 to keep track of both discharging the battery 160, as well as charging the battery, thereby maintaining an updated value for the present stored charge CAP in the battery.

2. The remaining time TCAP, as viewed in the CC phase, is the sum of the expected remaining time in both the CC phase and the CV phase. The pre-measured duration of the CV-phase is TCVTOT. Thus, the duration of the CC-phase TCC=TCAP−TCVTOT.

3. The duration of the CC-phase TCC may be corrected by the ratio of the charging current measured in the pre-measurements (IBATCC) and the actual present charging current (IBAT): TCCCOR=TCC*(IBATCC/IBAT).

4. The remaining charging time is the sum of the corrected remaining time of the CC phase and the total duration of the CV phase: TREM=TCCCORR+TCV If the charging is detected to be in the CC phase, even though TCAP<pre-measured duration of the CV-phase TCV-TOT, then TCAP is used as the result: The remaining charging time estimate TREM=TCAP.

The value of TREM is then displayed on the display 125 to the user as remaining charging time estimate.

Calculating the Remaining Charging Time Estimate During the CV Phase

A voltage-based approach may not be applicable or may be inaccurate in the constant voltage phase. Also, an approach based on the estimated stored battery charge (as used in the initial/CC phase) may be inaccurate because the charge rate near end of the charge is relatively low and a small error in the stored battery charge may then cause an error in the remaining charging time.

On the other hand, the charging current (IBAT) behaves in a very predictable way during the CV phase. The charging current decreases and when it reaches the termination limit, the charging is considered complete.

The remaining charging time during the CV phase may thus be estimated as a mapping from the charging current, using the pre-measured data: TREM=T(IBAT). Since the pre-measured data is stored as a set of data-points in data set 210, interpolation is used to find the time more accurately. T may also be represented as a mathematical model that fits to the pre-measured data.

Post-Filtering

During the CC phase, the current consumed by the device 100 affects the remaining charging time. In example embodiments of the invention, the method accounts for the current consumed by the device 100, based on the estimation that the device 100 consumption stays the same during the rest of the charge. There may be sudden, but temporary, changes in the device 100 energy consumption during charging. A simple example is that normally the screen backlight may be turned off, but the user turns on the display for a short time. When the backlight is turned on, the user is likely to see the display of the remaining charging time estimate. It may then be inaccurate to show a value for the remaining charging time estimate based on this temporarily increased energy consumption.

When the charging proceeds from the CC mode to the CV mode, the remaining charging time estimation technique becomes more accurate. It is advantageous that the later CV phase of the charge may be estimated more accurately. However, it is not optimal if the remaining charging time estimation suddenly changes during charging.

For these reasons, a form of post filtering may be applied to the results produced by the described method. An applicable filter may be a moving average filter described, as follows:

1. The estimated remaining charging duration is calculated as described for example once in a minute.

2. Each estimated remaining charging duration is converted to estimated charge completion instant by adding the present timestamp to it.

3. An average is taken of the most recent estimated charge completion instants, for example the last four values.

4. The average of the estimated charge completion instants is then converted to estimated remaining charging duration by subtracting the current timestamp from it.

In an example embodiment of the invention, the battery charge level may be expressed in various other formats, such as an arbitrary scale (for example 0-10), in graphical formats (for example, battery bars), color or shape of a symbol, remaining operating time (for example, an announcement "The current battery charge allows XX minutes of music playback or YY minutes of telephone calling.").

Figure 5:
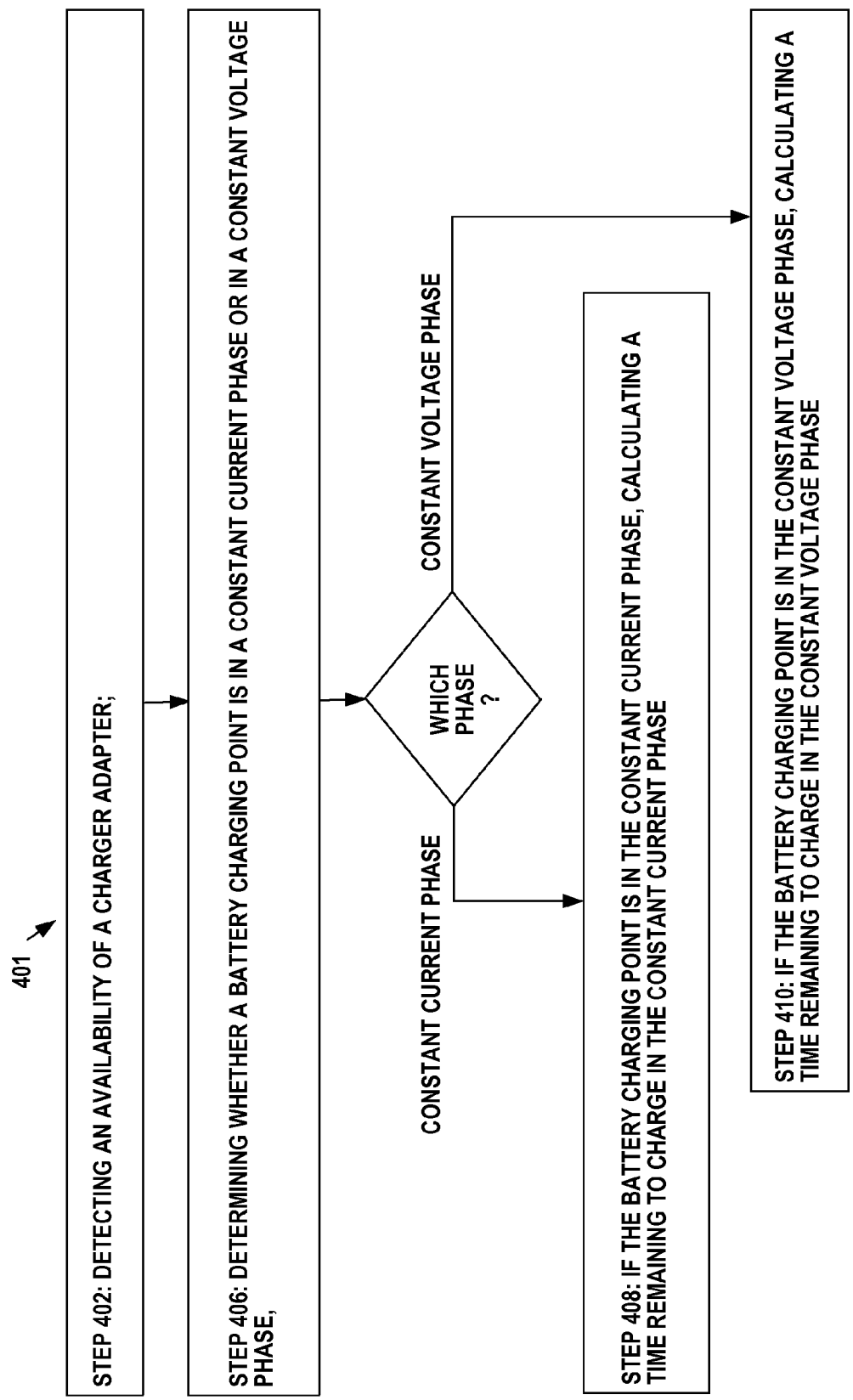
FIG. 5 is an example flow diagram of an example method for estimating the remaining charging time of a rechargeable battery, in accordance with an embodiment of the invention.

FIG. 5 is an example flow diagram 401 of an example method for estimating the remaining charging time of a rechargeable battery 160, in accordance with an embodiment of the invention, with example steps as follows:

Step 402: detecting an availability of a charger adapter;

Step 406: determining whether a battery charging point is in a constant current phase or in a constant voltage phase, based on pre-determined battery charging characteristics, wherein the pre-determined battery charging characteristics comprise constant current phase charging characteristics and constant voltage phase charging characteristics;

Step 408: if the battery charging point is in the constant current phase, calculating a time remaining to charge in the constant current phase based on the constant current phase charging characteristics and a time remaining to charge in the constant voltage phase based on the constant voltage phase charging characteristics. In step 408 the present capacity and the present charging current are also inputs for this calculation.

Step 410: if the battery charging point is in the constant voltage phase, calculating a time remaining to charge in the constant voltage phase based on the constant voltage phase charging characteristics. In step 410 the present charging current is also an input for this calculation.

The steps of the flow diagram 401 of FIG. 5 represent computer code instructions stored in the RAM and/or ROM memory of the device 100, which when executed by the CPU, carry out the functions of the example embodiments of the invention. The steps may be carried out in another order than shown and individual steps may be combined or separated into component steps.

Example embodiments of the invention include an apparatus, comprising:

means for detecting an availability of a charger adapter;

means for determining whether a battery charging point is in a constant current phase or in a constant voltage phase, based on pre-determined battery charging characteristics, wherein the pre-determined battery charging characteristics comprise constant current phase charging characteristics and constant voltage phase charging characteristics;

means for calculating a time remaining to charge in the constant current phase based on the constant current phase charging characteristics, if the battery charging point is in the constant current phase; and means for calculating a time remaining to charge in the constant voltage phase based on the constant voltage phase charging characteristics, if the battery charging point is in the constant voltage phase.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes may be made to the specific example embodiments without departing from the spirit and scope of the invention.

What is claimed is:

1. A method, comprising:

detecting, by an apparatus, an availability of a charger adapter;

determining, by the apparatus, whether a battery charging point is in a constant current phase or in a constant voltage phase, based on pre-determined battery charging characteristics, wherein the pre-determined battery charging characteristics comprise constant current phase charging characteristics and constant voltage phase charging characteristics;

calculating, by the apparatus, a time remaining to charge in the constant current phase based on the constant current phase charging characteristics, if the battery charging point is in the constant current phase; and calculating, by the apparatus, a time remaining to charge in the constant voltage phase based on the constant voltage phase charging characteristics, if the battery charging point is in the constant voltage phase;

wherein the time remaining to charge in the constant current phase is based on stored charge characteristics in the constant current phase, when the battery charging point is in the constant current phase and wherein battery stored charge characteristics comprises a battery stored charge value based on monitored tracking of battery charging and discharging.

2. The method of claim 1, wherein the battery stored charge characteristics comprise data that provides a remaining charging time estimate based on a battery stored charge estimate.

3. The method of claim 1, wherein the time remaining to charge in the constant current phase comprises a pre-measured duration to account for the constant voltage phase that follows the constant current phase, when the battery charging point is in the constant current phase.

4. The method of claim 1, wherein the time remaining to charge in the constant voltage phase is based on charging current characteristics in the constant voltage phase, when the battery charging point is in the constant voltage phase.

5. The method of claim 1, further comprising:

identifying, by the apparatus, a correct category of the charger adapter after detecting its availability; and configuring, by the apparatus, battery charging based in the category of the charger adapter.

6. The method of claim 1, further comprising:

identifying, by the apparatus, a correct category of the charger adapter after detecting its availability; and using, by the apparatus, the category of the charger adapter to improve accuracy of an initial remaining charging time estimation.

7. The method of claim 1, further comprising:

calculating, by the apparatus, a time remaining to charge in the constant current phase based on the constant current phase charging characteristics and a time remaining to charge in the constant voltage phase based on the constant voltage phase charging characteristics, if the battery charging point is in the constant current phase.

8. The method of claim 1, further comprising:

correcting, by the apparatus, the time remaining to charge in the constant current phase by a ratio of charging current measured in the pre-determined battery charging characteristics and an actual present charging current.

9. The method of claim 1, further comprising:

correcting, by the apparatus, the time remaining to charge in the constant current phase by a ratio of charging current measured in the pre-determined battery charging characteristics and an actual present charging current; and calculating, by the apparatus, a total remaining charging time as a sum of the corrected remaining time in the constant current phase and a total duration of the constant voltage phase.

10. The method of claim 1, further comprising:

post filtering, by the apparatus, the calculated time remaining to charge by converting a duration of calculated time remaining to charge into an estimated charge completion instant by adding a present timestamp to the duration;

calculating, by the apparatus, an average of estimated charge completion instants; and converting, by the apparatus, the average of the estimated charge completion instants into an estimated remaining charging duration by subtracting a current timestamp from the average of the estimated charge completion instants.

11. The method of claim 1, wherein a duration of the constant current phase is a pre-measured value of an estimated remaining charging time based on a battery stored charge estimate minus a pre-measured duration of the constant voltage phase, when the battery charging point is in the constant current phase.

12. The method of claim 11, wherein the duration of the constant current phase is corrected by a ratio of a pre-measured charging current and an actual present charging current; and the time remaining to charge is a sum of the corrected duration of the constant current phase and a total duration of the constant voltage phase.

13. The method of claim 1, wherein a remaining charging time during the constant voltage phase is estimated as a mapping from charging current, using pre-measured data, when the battery charging point is in the constant voltage phase.

14. A non-transitory computer readable medium, comprising program instructions, which when executed by a computer processor, perform:

detecting an availability of a charger adapter;

determining whether a battery charging point is in a constant current phase or in a constant voltage phase, based on pre-determined battery charging characteristics, wherein the pre-determined battery charging characteristics comprise constant current phase charging characteristics and constant voltage phase charging characteristics;

calculating a time remaining to charge in the constant current phase based on the constant current phase charging characteristics, if the battery charging point is in the constant current phase; and calculating a time remaining to charge in the constant voltage phase based on the constant voltage phase charging characteristics, if the battery charging point is in the constant voltage phase;

wherein the time remaining to charge in the constant current phase is based on stored charge characteristics in the constant current phase, when the battery charging point is in the constant current phase and wherein battery stored charge characteristics comprises a battery stored charge value based on monitored tracking of battery charging and discharging.

15. An apparatus, comprising:

at least one processor;

at least one memory including computer program code;

the at least one memory and the computer program code configured to, with the at least one processor, cause the processor at least to:

detect an availability of a charger adapter;

determine whether a battery charging point is in a constant current phase or in a constant voltage phase, based on pre-determined battery charging characteristics, wherein the pre-determined battery charging characteristics comprise constant current phase charging characteristics and constant voltage phase charging characteristics;

calculate a time remaining to charge in the constant current phase based on the constant current phase charging characteristics, if the battery charging point is in the constant current phase; and calculate a time remaining to charge in the constant voltage phase based on the constant voltage phase charging characteristics, if the battery charging point is in the constant voltage phase;

wherein the time remaining to charge in the constant current phase is based on stored charge characteristics in the constant current phase, when the battery charging point is in the constant current phase and wherein battery stored charge characteristics comprises a battery stored charge value based on monitored tracking of battery charging and discharging.

16. The apparatus of claim 15, wherein the battery stored charge characteristics comprise data that provides a remaining charging time estimate based on a battery stored charge estimate.

* * * * *